No. 860,827.  
PATENTED JULY 23, 1907.  
A. B. REID.  
GARMENT FASTENER.  
APPLICATION FILED DEC. 2, 1903.
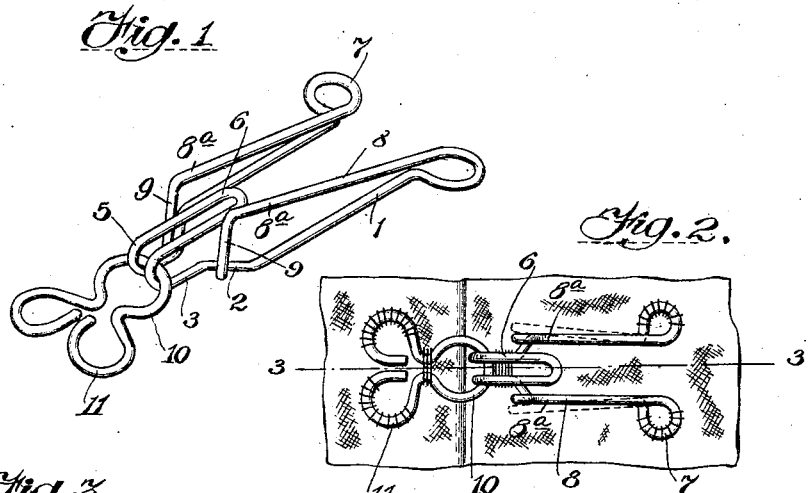
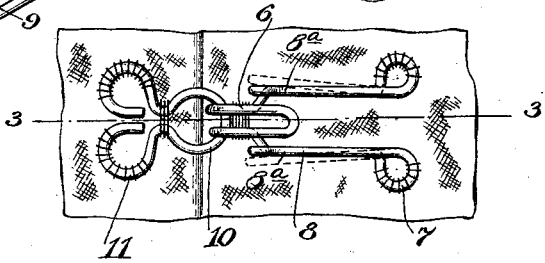
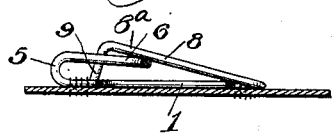
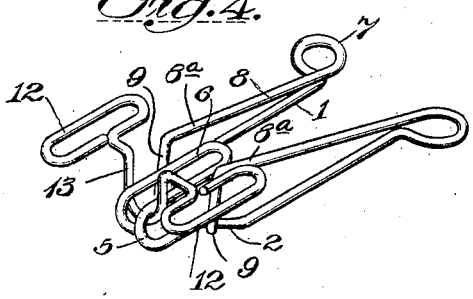
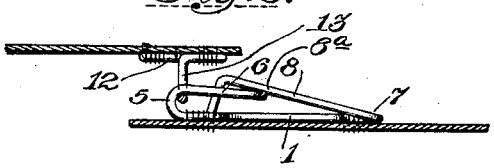
Witnesses:  
Robert H Weir  
W. Perry Hahn
Inventor:  
Arthur B. Reid  
By: James Addington  
Attorneys

UNITED STATES PATENT OFFICE.

ARTHUR B. REID, OF CHICAGO, ILLINOIS.

GARMENT-FASTENER.

No. 860,827.  Specification of Letters Patent.  Patented July 23, 1907.

Application filed December 2, 1903. Serial No. 183,543.

*To all whom it may concern:*

Be it known that I, ARTHUR B. REID, a citizen of the United States, residing at Chicago, in the county of Cook and State of Illinois, have invented a certain new and useful Improvement in Garment-Fasteners, of which the following is a full, clear, concise, and exact description, reference being had to the accompanying drawing, forming a part of this specification.

My invention relates to garment fasteners and particularly that class thereof known as hooks and eyes.

It is the object of my invention to produce a device of the character described in which the bill of the hook will be protected from catching upon extraneous objects, and in which the eye will not become accidentally detached from the hook.

A further object of my invention is to produce a device which will be simple in construction, cheap to manufacture and easy to manipulate.

Forms of hook and eye which I have worked out for the purpose of disclosing my invention, are illustrated in the accompanying drawings, in which:

Figure 1 is a perspective view of a hook and eye embodying my invention; Fig. 2 is a plan view thereof; Fig. 3 is a longitudinal section on the line 3—3 of Fig. 2 the eye being omitted; Fig. 4 is another perspective view of the hook with a modified form of eye; and, Fig. 5 is a longitudinal section of the hook and eye shown in Fig. 4.

The hook shown in said drawings is preferably constructed of wire and may be formed from a single piece of wire as shown.

The two parallel portions of wire forming the shank are bent inwardly at their forward ends to form the shoulders 2, and the restricted shank portion 3. The hook 5 is formed with a bill 6. The rear portion of the shank may be formed into loops 7 through which threads may be passed to secure the hook in position although other securing means may be employed if desired. From the rear end of the hook resilient tongues 8 extend forwardly and upwardly to points upon each side of the bill 6 and their forward highest portion 8$^a$ extend above the bill 6. The tongues 8 have downwardly extending portions 9 which are adapted to prevent the eye from passing beneath the tongues and in connection with the shoulders to aid in guiding the tongues 8. The resilient tongues thus prevent the eye from becoming disengaged from the hook when in use, and the higher portions 8$^a$ upon each side of the bill 6 serve as guards to shield the bill and prevent the same from becoming engaged with extraneous objects. To further aid in holding the hook in position for use and to secure the front of the hook in place, several loops of thread may be passed over the restricted shank portion 3, as shown in Fig. 2.
Any suitable form of eye may be used with this hook. I preferably employ an eye formed of one piece of wire bent to form the eye 10 and the loops 11, through which thread may be passed to secure the same in position. Several loops of thread may be also passed over the restricted portion between the eye 10, and loops 11 to more securely hold the eye in position see Fig. 2. By sewing the eye to the garment at this point, it is prevented from being forced backwardly by any movement of the tongue and is held firmly in position.

When it is desired to engage the hook with the eye, the eye is forced between the resilient tongues 8 at a point some distance to the rear of the bill 6. The tongues will thus be spread apart or separated as shown in dotted lines in Fig. 2, and the eye may be drawn forward to engage the hook 5, when the resilient tongues will spring back to their normal position and the downwardly extending portions 9 will effectually prevent the eye from being disengaged in ordinary usage. It is apparent that in order to disengage the eye from the hook, the eye may be forced backwardly or the hook forwardly with sufficient force to spread the laterally movable arms far enough to permit the eye to be disengaged from the bill of the hook.

In Figs. 4 and 5 is shown a modified form of eye. In this form, the eye is formed with the loops 12 for fastening the same to the garment and the eye portion 13 which, instead of lying flat upon the garment as in the form shown in Figs. 1 and 2, projects therefrom at right angles. This eye is provided for use with garments which fit the wearer snugly, and as it is hard to insert the finger under the garment to guide the eye into position, this form of eye permits the ready engagement of the eye with the bill of the hook.

While I have shown and described the preferred embodiment of my invention, I do not wish to limit myself to this particular construction as there are many forms in which the device may be made within the scope of the appended claims without departing from the spirit of my invention.

Having described my invention what I claim as new and desire to secure by Letters Patent is:

1. In a hook, the combination with a bill, of resilient members separable to permit the eye to engage the bill and to be disengaged therefrom, and extending beyond the point of the bill and arranged to prevent extraneous objects from engaging the bill.

2. In a hook, the combination with a bill, of resilient members disposed on opposite sides of said bill separable to permit the eye to engage the bill and to be disengaged therefrom, and extending beyond the point of the bill and arranged to prevent extraneous objects from engaging the bill.

3. In a hook, the combination with a bill, of a pair of upwardly inclined resilient members separable to permit the eye to engage the bill and to be disengaged therefrom, and extending beyond the point of the bill and arranged to prevent extraneous objects from engaging the bill.

4. In a hook, the combination with a bill, of a pair of upwardly inclined resilient members disposed upon opposite sides of said bill separable to permit the eye to engage the bill and be disengaged therefrom, and extending beyond the point of the bill and arranged to prevent extraneous objects from engaging the bill.

5. In a hook, the combination with a bill, of a pair of upwardly inclined resilient members having downwardly turned front parts to prevent the eye from passing beneath the same and from being disengaged from the hook, said members being separable to permit the eye to engage the bill and be disengaged therefrom, and extending beyond the point of the bill and arranged to prevent extraneous objects from engaging the bill.

6. In a hook, the combination with a pair of upwardly inclined resilient members disposed on opposite sides of the bill, and having downwardly turned front portions to prevent the eye from passing beneath said members, and from becoming disengaged from the hook, said members being separable to permit the eye to engage the bill and be disengaged therefrom, and extending beyond the point of the bill and arranged to prevent extraneous objects from engaging the bill.

7. In a hook, the combination with a bill having a shank restricted at its forward ends to form shoulders, of members arranged to prevent extraneous objects from engaging the bill and having downwardly inclined portions arranged in front of said shoulders to prevent the eye from passing beneath said members, said members being laterally movable from said bill to permit the eye to engage the bill and to be disengaged therefrom.

8. In a hook, the combination with a bill having a shank restricted at its forward end to form shoulders and having its rear end bent to form loops for securing the hook to the garment, of resilient members extending forwardly from the rear of the shank and having downwardly extending portions arranged in front of said shoulders to prevent the eye from passing beneath said members, said members being laterally movable from said bill to permit the eye to engage the bill and to be disengaged therefrom.

9. A hook formed from a single piece of wire and consisting of a bill, a shank having loops formed at its rear end, and a pair of forwardly extending resilient members having downwardly turned front portions to prevent the eye from passing beneath the said members, said members being extended beyond the point of the bill and arranged to prevent objects from engaging the bill and being separable to permit the eye to engage the bill and be disengaged therefrom.

10. In a hook, the combination with a bill, of resilient members separable to permit the eye to engage the bill and be disengaged therefrom, and extending beyond the point of the bill and arranged to prevent extraneous objects from engaging the bill, downwardly inclined portions extending from said members and arranged to prevent the eye from passing beneath said members, and portions arranged on the shank of the hook for guiding said members.

In witness whereof, I have hereunto subscribed my name in the presence of two witnesses.

ARTHUR B. REID.

Witnesses:
M. R. ROCHFORD,
W. P. HAHN.